United States Patent
Richter

(10) Patent No.: US 10,569,283 B2
(45) Date of Patent: Feb. 25, 2020

(54) PLATE SEPARATOR

(71) Applicant: AUDI AG, Ingolstadt (DE)

(72) Inventor: Swen Richter, Dollnstein (DE)

(73) Assignee: AUDI AG, Ingolstadt (DE)

( * ) Notice: Subject to any disclaimer, the term of this patent is extended or adjusted under 35 U.S.C. 154(b) by 264 days.

(21) Appl. No.: 15/895,471

(22) Filed: Feb. 13, 2018

(65) Prior Publication Data

US 2018/0290151 A1    Oct. 11, 2018

(30) Foreign Application Priority Data

Apr. 6, 2017 (DE) .................... 10 2017 205 852

(51) Int. Cl.

| B01D 45/14 | (2006.01) |
|---|---|
| B04B 9/04 | (2006.01) |
| F01M 13/04 | (2006.01) |
| B04B 5/12 | (2006.01) |
| B04B 9/08 | (2006.01) |
| H02K 7/16 | (2006.01) |

(52) U.S. Cl.
CPC .............. B04B 9/04 (2013.01); B01D 45/14 (2013.01); B04B 5/12 (2013.01); B04B 9/08 (2013.01); F01M 13/04 (2013.01); H02K 7/16 (2013.01); B04B 2005/125 (2013.01); F01M 2013/0422 (2013.01)

(58) Field of Classification Search
CPC ................................ B01D 45/12; B01D 45/14
USPC .................................................... 55/400, 406
See application file for complete search history.

(56) References Cited

U.S. PATENT DOCUMENTS

| 7,022,163 B2 * | 4/2006 | Olsson .................. B01D 45/14 95/268 |
|---|---|---|
| 9,415,400 B2 | 8/2016 | Klintenstedt |
| 2009/0186752 A1 | 7/2009 | Isaksson et al. |

FOREIGN PATENT DOCUMENTS

| DE | 103 00 976 A1 | 7/2003 |
|---|---|---|
| DE | 103 38 770 A1 | 3/2005 |
| DE | 102009036476 A1 | 5/2010 |
| EP | 2 020 485 A2 | 2/2009 |
| KR | 100447007 B1 | 9/2004 |

OTHER PUBLICATIONS

European Search Report dated Aug. 31, 2018, in connection with corresponding EP Application No. 18155040.1 (7 pgs.).
German Search Report dated Oct. 13, 2017 of corresponding German application No. 102017205852.8; 8 pgs.

* cited by examiner

Primary Examiner — Robert A Hopkins
(74) Attorney, Agent, or Firm — Maier & Maier, PLLC

(57) ABSTRACT

A plate separator for separating a substance from a substance mixture, with a separator device and an electric motor for rotary driving of the separator device. The separator device is coupled to the electric motor in a rotationally fixed manner. The electric motor is configured as an external rotor and has an inner-lying stator and an outer-lying rotor in the radial direction with respect to an axis of rotation. The separator device is fastened to the rotor and extends outward from the rotor in the radial direction. The stator is arranged, as viewed in the axial direction with respect to the axis of rotation, at least partially overlapping with the separator device.

9 Claims, 1 Drawing Sheet

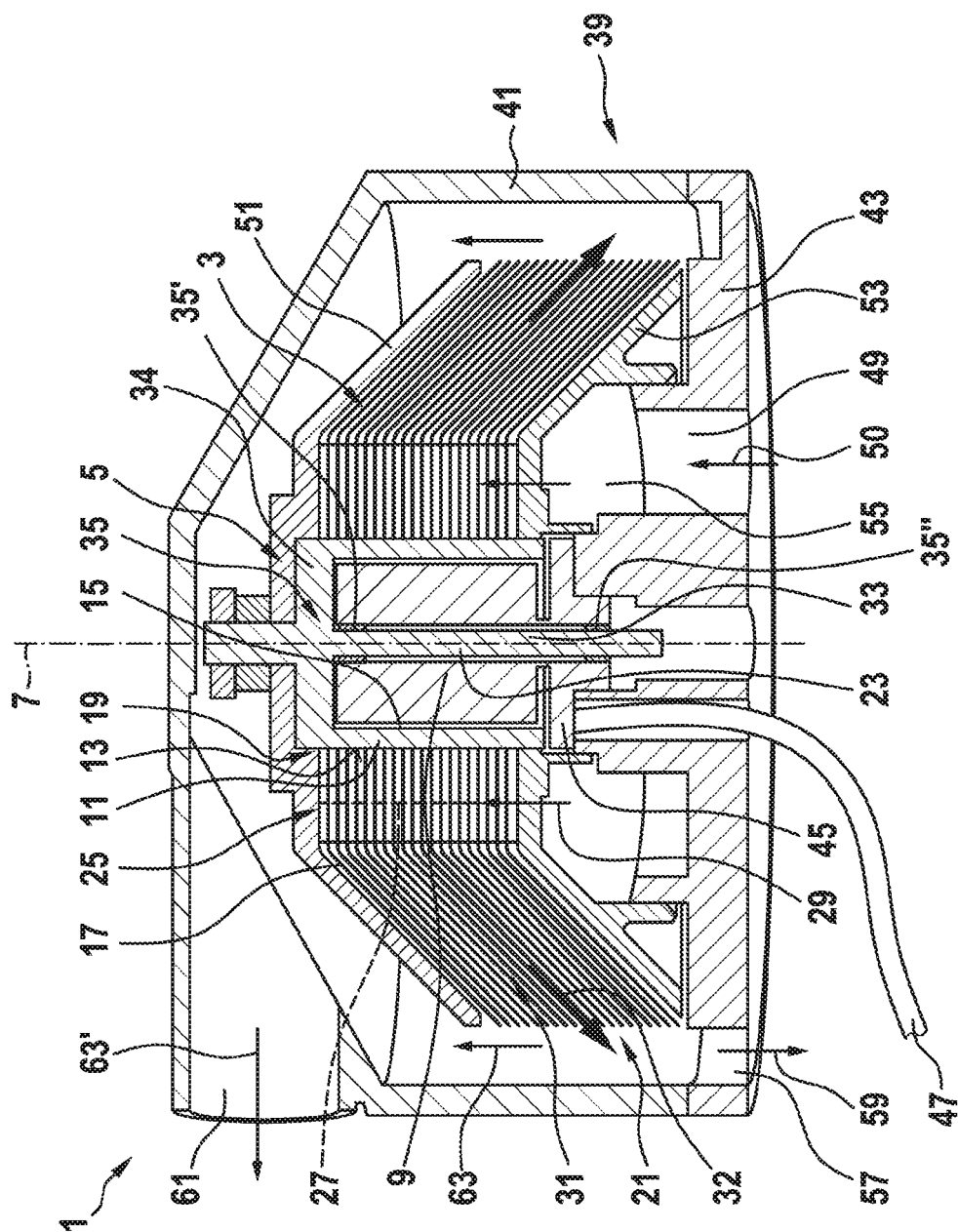

PLATE SEPARATOR

FIELD

The invention relates to a plate separator for separating a substance from a substance mixture.

BACKGROUND

Plate separators are often utilized as oil separators, for example, for the separation of oil from blow-by gases that penetrate into a crankcase of an internal combustion engine, in particular from a combustion chamber of an internal combustion engine. Electric motors, in particular, are used for the drive of plate separators of this kind. Typically, plate separators of this kind also have a separator device with a plurality of rotatable plate elements. A relatively large installation space is required for the drive and the separator device of a plate separator of the kind being addressed. In addition, a separate mounting is required for the drive and the separator device, respectively, thereby resulting in corresponding costs.

Known from the prior art is, for example, the publication DE 10 2009 036 476 A1. It relates to a centrifugal separator for separating oil mist from the crankcase ventilation gas of an internal combustion engine or for separating solid contaminants from the lubricating oil of an internal combustion engine, wherein the centrifugal separator has a rotor, which can be rotationally driven, a housing, which accommodates the rotor, and a rotary drive for the rotor, wherein the rotary drive is formed by an electric motor, which is arranged in the housing. Means are provided thereby for cooling the electric motor.

SUMMARY

The invention is based on the object of creating a plate separator that, in comparison to known plate separators, offers advantages and, in particular, requires a smaller installation space and, in addition, has a bearing with fewer bearing points, thereby resulting in cost savings.

In accordance with the invention, it is provided that the rotor is mounted rotatably by means of a bearing shaft, which engages through the stator at least partially in the axial direction. Fundamentally, a plate separator for separating a substance from a substance mixture, this separator having a separator device and an electric motor for rotary driving of the separator device, is created. In this case, the separator device is coupled to the electric motor in a rotationally fixed manner. It is provided that the electric motor is designed as an external rotor and has an inner-lying stator in the radial direction with respect to an axis of rotation of the electric motor. Here, the separator device is fastened to the rotor and extends outward from the rotor in the radial direction. In this case, the stator is arranged, as viewed in the axial direction with respect to the axis of rotation, at least partially overlapping with the separator device.

The plate separator has numerous advantages in comparison to the prior art. Owing to the fact that the stator, as viewed in the axial direction with respect to the axis of rotation, is arranged at least partially overlapping with the separator device, an installation space required for the plate separator can be reduced. In particular, in comparison with known plate separators, for which the separator device and the drive are offset axially and/or spaced apart with respect to each other, there results a reduction in the required installation space in the axial direction. Beyond this, it is possible to dispense with separate bearings for a shaft of the separator device and a drive shaft of the electric motor, respectively. Because, for the plate separator according to the invention, the shaft of the separator device and the drive shaft of the electric motor have an integral construction, it is possible, in comparison with known plate separators, to provide a bearing with fewer bearing points, thereby resulting in cost savings and a reduction in the required installation space.

In a preferred embodiment, the plate separator is designed as an oil separator. Preferably, the plate separator is equipped for separating oil from an oil-containing substance mixture. Preferably, the oil-containing substance mixture is a blow-by gas that, in particular, penetrates from a combustion chamber of an internal combustion engine into a crankcase thereof. In accordance with the operating principle of known plate separators, the substance is separated from the substance mixture as a result of the rotary driving of the separator device and the centrifugal forces thereby generated. In particular, it is possible by means of the plate separator to separate from one another various phases of the substance mixture, each of which has a different density.

Preferably, the rotor has a cylindrically formed outer sleeve surface and an inner side. With the inner side, the rotor interacts with the stator in accordance with the operating principle of known electric motors. Preferably, the rotor is bell-shaped in design, wherein it overlaps the stator axially in accordance with the construction of known external rotor motors and at least partially in the peripheral direction of the stator. As a result, the rotor serves, in particular, as a shaft of the separator device and as a drive shaft of the electric motor.

In particular, the separator device is fastened at the rotor in such a way that it is held securely, taking into consideration the forces and accelerations occurring during an intended operation of the plate separator.

A further development of the invention provides that the separator device has a plurality of plate elements, which are arranged coaxially with respect to one another. Preferably, the plurality of plate elements are arranged at equal spacing from one another in the axial direction. More preferably, the plurality of plate elements are each essentially identical in form. In a preferred embodiment of the plate separator, the plurality of plate elements are formed in one piece with one another. By way of this configuration, it is possible to realize a technologically mature and cost-effective design of the plate separator.

In accordance with a further development of the invention, the plurality of plate elements are each annular in form, wherein—as viewed in section—they each have an inner-lying first end in the radial direction and an outer-lying second end in the radial direction. Preferably, the plurality of plate elements are each arranged at the first end at the rotor in a rotationally fixed manner. Preferably, the plurality of plate elements are arranged concentrically with respect to the rotor. Preferably, the plurality of plate elements are each engaged around the rotor in a peripheral direction thereof. Preferably, the plurality of plate elements are each fastened to the rotor in a form-fit, force-fit, and/or material-bonded manner, in particular permanently and/or rigidly. Furthermore, the plurality of plate elements are arranged at the rotor preferably fixed in the axial direction, in particular permanently and/or rigidly. As a result of this design of the separator device, a simple and cost-effective realization of the plate separator is made possible.

A further development of the invention provides that the first end of at least one of the plurality of plate elements is arranged inside of the region of the axis of rotation over which the stator extends axially in the transverse direction with respect to the axis of rotation. More preferably, the plurality of plate elements are for the most part arranged in such a way that their first ends are each arranged inside of the region of the axis of rotation over which the stator extends axially, in the transverse direction with respect to the axis of rotation. In this way, in particular, the overlap of the separator device with the stator in the axial direction with respect to the axis of rotation is as large as possible. It is possible in this way to realize—in particular as viewed in the axial direction—an especially compact design of the plate separator.

In accordance with a further development of the invention, the plurality of plate elements each have a first annular region, which extends radially from the first end in the direction of the second end. In particular, a radially outer-lying end region of the first annular region runs concentrically with respect to the axis of rotation. Preferably, the plurality of plate elements in the first annular region are essentially flat in design and are arranged perpendicular to the axis of rotation. By way of this design, it is possible to achieve, in an advantageous manner, an especially effective separatory action of the plate separator, in particular by way of a high acceleration of the substance mixture.

A further development of the invention provides that the substance mixture can be fed to the plurality of plate elements in the region of the first annular region. More preferably, the substance mixture can be fed to the plurality of plate elements via at least one feed path in the region of the first annular region, which, in particular, runs in the axial direction. Preferably, the at least one feed path runs, in particular with respect to the axis of rotation, in a helical or spiral manner around the outer sleeve surface of the rotor. Preferably, the at least one feed path runs through a plurality of axial perforations and/or recesses in or on the plurality of plate elements in the first annular region, wherein the substance mixture is fed in the axial direction all the way through the plurality of plate elements and/or is guided past the plurality of plate elements, in particular when the separator device rotates in operation.

From the at least one feed path, the substance mixture is fed, in particular, to the respective plate elements, so that the substance mixture can be conveyed radially outward between these and/or onto these. On account of the centrifugal forces, the substance mixture is accelerated from the at least one feed path in the radial direction—in accordance with the operating principle of known plate separators—and guided all the way through between the plurality of plate elements, thereby effecting the separation of the substance from the substance mixture. In particular, it is not necessary in this case to provide channels, recesses, or the like in the rotor itself, thereby making possible an especially cost-effective design of the plate separator.

In accordance with a further development of the invention, it is provided that the plurality of plate elements each have a second annular region, each of which adjoins the first annular region and extends all the way to the second end. The second end runs preferably concentrically with respect to the axis of rotation. Preferably, the plurality of plate elements in the second annular region have essentially the form of a conical section and enclose an angle of less than 90° and greater than 0° with the axis of rotation. It is possible here for the plurality of plate elements each to be directed with the second end, as opposed to the first end, in a first axial direction or in a second axial direction that is opposite to the first axial direction. Preferably, the plurality of plate elements are each formed in one piece with one another in the first annular region and in the second annular region. In this way, it is possible to produce the plurality of plate elements in a cost-effective manner, in particular by means of a suitable reshaping or primary shaping fabrication method. More preferably, the plurality of plate elements in the second annular region each enclose an angle of at least 30° to at most 60°, more preferably of 45°, with the axis of rotation. More preferably, the plurality of plate elements in the second annular region each enclose the same angle with the axis of rotation. By way of this configuration, it is possible to ensure an especially effective separatory action of the plate separator.

In accordance with a further development of the invention, it is provided that the plurality of plate elements are formed in one piece with the rotor. In this way, it is possible, on the one hand, to realize an especially stable fastening of the plurality of plate elements to the rotor. On the other hand, an integral construction of the plurality of plate elements and of the rotor makes it possible to reduce costs for the production thereof.

The invention provides that the rotor is rotatably mounted by means of a bearing shaft, which engages through the stator at least partially in the axial direction. Preferably, the rotor is firmly connected to the bearing shaft, in particular via a connecting section arranged at the rotor and/or at the bearing shaft, in particular permanently and/or rigidly. More preferably, the rotor and the bearing shaft, in particular including the connecting section, are formed in one piece with one another. In this way, it is possible to achieve an especially compact construction of the plate separator and a simple bearing.

A further development of the invention provides that the plate separator has a housing, which is firmly connected to the stator, in particular permanently and/or rigidly. By way of this configuration, it is possible in an advantageous manner to configure the separator device and the electric motor as a module, wherein this module can be combined with variously designed housings and accordingly can be utilized in various applications, thereby resulting in cost synergies.

BRIEF DESCRIPTION OF THE FIGURE

The invention will be explained in detail below on the basis of the drawing, without any limitation of the invention thereby occurring. The sole FIGURE shows FIG. 1 shows a schematic illustration of an exemplary embodiment of the plate separator in a longitudinal section.

DETAILED DESCRIPTION OF THE FIGURE

FIG. 1 shows a plate separator 1 for separating a substance from a substance mixture. Preferably, the plate separator 1 is designed as an oil separator for separating oil from blow-by gas. The plate separator 1 has a separator device 3 and an electric motor 5 for rotary driving of the separator device 3. The separator device 3 is coupled to the electric motor 5 in a rotationally fixed manner. The electric motor 5 is configured as an external rotor and has an inner-lying stator 9 and an outer-lying rotor 11 in the radial direction with respect to an axis of rotation 7 of the electric motor 5.

Here, the rotor 11 has an essentially cylindrically shaped outer sleeve surface 13. Furthermore, in this case, the rotor 11 has an inner side 15, which interacts with the stator 9 in accordance with the operating principle of known electric motors.

The separator device 3 is fastened to the rotor 11 and extends outward from the rotor 11 in the radial direction. As viewed in the axial direction with respect to the axis of rotation 7, the stator 9 is at least partially overlapping with the separator device 3.

The separator device 3 has a plurality of plate elements 17, which are arranged coaxially with respect to one another, wherein, for reasons of clarity, only one plate element 17 is provided with a reference number. In this case, the plurality of plate elements 17 are essentially identical in form and are uniformly spaced apart from one another axially.

Accordingly, the rotor 11 serves in this case as a shaft of the separator device 3 and as a drive shaft of the electric motor 5. As a result, an especially compact design of the plate separator 1—as viewed in the axial direction—is obtained.

By means of the electric motor 5, the separator device 3 can be rotated around the axis of rotation 7, as a result of which—in accordance with the operating principle of known plate separators—a separation of the substance from the substance mixture that is fed to the separator device 3 is effected by means of the resulting centrifugal forces.

The plurality of plate elements 17 each have a ring-shaped or annular form with respect to a central axis or the axis of rotation 7, wherein—as viewed in the longitudinal section with respect to this axis—each have one inner-lying first end 19 in the radial direction and one outer-lying second end 21 in the radial direction. The plurality of plate elements 17 are each arranged with the first end 19 at the rotor 11, in particular at the outer sleeve surface 13 thereof, in a rotationally fixed manner. In addition, the plurality of plate elements 17 are preferably each arranged firmly at the rotor 11 by the first end 19 with respect to their axial position as well.

The first end 19 of at least one of the plurality of plate elements 17 is preferably arranged inside a region 23 of the axis of rotation 7, over which the stator 9 extends axially, in the transverse direction with respect to the axis of rotation 7. In the exemplary embodiment illustrated in the FIGURE, the first end 19 of a large part of the plurality of plate elements 17 is arranged inside the region 23 of the axis of rotation 7, over which the stator 9 extends axially, in the transverse direction with respect to the axis of rotation 7. Accordingly, there results an especially large overlapping of the separator device 3 with the stator 9 in the axial direction. As a result, it is possible to realize—in particular as viewed in the axial direction—an especially compact construction of the plate separator 1.

The plurality of plate elements 17 each have a first annular region 25, which extends from the first end 19 radially in the direction of the second end 21. The plurality of plate elements 17 are essentially flat in form in the first annular region 25 and are arranged perpendicular to the axis of rotation 7.

The substance mixture can be fed to the plurality of plate elements 17 in the region of the first annular region 25. In the exemplary embodiment shown here, the substance mixture is fed along at least one feed path 27, which runs essentially transverse to the first annular region 25 in the axial direction, wherein a preferred flow direction of the substance mixture is indicated schematically by an arrow 29. In this case, the at least one feed path 27 is spaced radially outward from the outer sleeve surface 13 of the rotor 11 and passes, in particular, through perforations provided in each of the plurality of plate elements 17.

The plurality of plate elements 17 each have a second annular region 31, each of which adjoins the first annular region 25 and extends all the way to the second end 21. The plurality of plate elements 17 have essentially the form of a conical section in the second annular region 31 and enclose an angle of preferably less than 90° and greater than 0°—in this case, about 45°—with the axis of rotation 7. In the exemplary embodiment illustrated here, the plurality of plate elements 17 in the second annular region 31 are each bent downward—as viewed by an observer—in comparison to the first annular region 25. In an alternative exemplary embodiment, which is not illustrated here, the plurality of plate elements 17 in the second annular region 31 are bent upward—as viewed by the observer—in comparison to the first annular region 25.

Preferably, the plurality of plate elements 17 are formed in one piece with the rotor 11.

On account of the centrifugal forces, the substance mixture is fed, in particular, by the at least one feed path 27 radially outward all the way between the plurality of plate elements 17, wherein a separation of the substance from the substance mixture is effected. A flow of the substance mixture is illustrated here schematically by means of an arrow 32.

The rotor 11 is mounted rotatably by means of a bearing shaft 33, which engages through the stator 9 at least partially in the axial direction. In this case, the rotor 11 is formed in one piece with the bearing shaft 33, wherein the rotor 11 is connected in one piece to the bearing shaft 33 via a disc-shaped connecting section 34. In the exemplary embodiment illustrated here, a bearing 35, which has a first bearing point 35' and a second bearing point 35", is provided. The bearing 35 can therefore be realized in an advantageous way for bearing a shaft of the separator device 3 and a drive shaft of the electric motor 5, because the shaft of the separator device 3 and the drive shaft of the electric motor 5 involve the same component, namely, in particular, the rotor 11. In this way, it is possible to design the plate separator 1 in an especially cost-effective manner.

In the exemplary embodiment illustrated here, the rotor 11, the connecting section 34, and the bearing shaft 33 are formed in one piece with one another. In an alternative exemplary embodiment, which is not illustrated here, the rotor 11, in particular an essentially cylindrical rotor, is formed by the outer sleeve surface 13 and the inner side 15 of adjacent elements and/or the connecting section 34 and/or the bearing shaft 33 as separate components. In this case, however, a one-piece design of these components is shown, because, in this way, it is possible to produce the plate separator 1 at especially favorable costs.

Furthermore, the plate separator 1 has a housing 39, which is firmly connected to the stator 9. In this case, the housing 39 has an upper part 41 and a base part 43. In the exemplary embodiment shown here, the stator 9 has a retaining section 45, by means of which the stator 9 is connected firmly to the base part 43.

A connecting cable 47 can be passed through the base part 43 for supplying the electric motor 5 with electrical energy. Furthermore, the base part 43 has an inlet 49, through which the substance mixture can be fed to the separator device 3 along a direction that is indicated schematically by the arrow 50.

Here, the separator device 3 has a top cover 51 and a bottom cover 53, wherein the plurality of plate elements 17 are arranged between the top cover 51 and the bottom cover 53. The top cover 51 covers the plurality of plate elements 17 from above, as viewed by the observer. In this case, the top cover 51 is coupled to the rotor 11 in a rotationally fixed manner. The bottom cover 53 covers the plurality of plate elements 17 from below, as viewed by the observer. The bottom cover 53 is preferably coupled to the rotor in a rotationally fixed manner. The top cover 51 and the bottom cover 53 overlap the plurality of plate elements 17 from the first end 19 thereof up to the second end 21 thereof in the radial direction.

The base part 43 and the bottom cover 53 form a cavity 55, into which the inlet 49 opens and which is in fluid connection with the at least one feed path 27. The substance mixture that is fed to the plate separator 1 via the inlet 49 can therefore be fed from the cavity 55 to the separator device 3 via the at least one feed path 27 of the separator device 3. Consequently, in operation, during a rotation of the separator device 3, in particular of the plurality of plate elements 17, the substance mixture can then be moved radially outward by the at least one feed path 27 all the way between the plurality of plate elements 17, a direction of movement of the substance mixture being illustrated schematically by the arrow 32. As a result, in accordance with the operating principle of known plate separators, a separation of the substance from the substance mixture is effected. The separated substance preferably exits the plate separator 1 through a first outlet 57 of the housing 39 along a flow direction indicated schematically by means of an arrow 59. A substance mixture that has been cleaned of the substance preferably exits the plate separator 1 via a second outlet 61 of the housing 39 along a flow direction indicated schematically by the arrows 63, 63'.

Overall, it is shown that, by way of the configuration of the plate separator in accordance with the invention, it is possible, in particular, to reduce substantially the space required for the installation thereof in comparison to conventional plate separators. Beyond this, it is possible to simplify a bearing through a reduction in the number of bearing points, as a result of which the costs thereof are reduced.

The invention claimed is:

1. A plate separator for separating a substance from a substance mixture, comprising;
    a separator device and an electric motor for rotary driving of the separator device, wherein
    the separator device is coupled to the electric motor in a rotationally fixed manner, wherein
    the electric motor is configured as an external rotor and has an inner-lying stator and an outer-lying rotor in the radial direction with respect to an axis of rotation of the electric motor, wherein
    the separator device is fastened to the rotor and extends outward from the rotor in the radial direction, wherein
    the stator is arranged, as viewed in the axial direction with respect to the axis of rotation, at least partially overlapping with the separator device, wherein
    the rotor is mounted rotatably by a bearing shaft, which engages through the stator at least partially in the axial direction.

2. The plate separator according to claim 1, wherein the separator device has a plurality of plate elements, which are arranged coaxially with respect to one another.

3. The plate separator according to claim 2, wherein the plurality of plate elements each have an annular form, wherein they each have an inner-lying first end in the radial direction and an outer-lying second end in the radial direction, and wherein the plurality of plate elements are each arranged on the rotor at the first end in a rotationally fixed manner.

4. The plate separator according to claim 3, wherein the first end of at least one of the plurality of plate elements is arranged within a region of the axis of rotation over which the stator extends axially, in the transverse direction relative to the axis of rotation.

5. The plate separator according to claim 3, wherein the plurality of plate elements each have a first annular region, which extends from the first end radially in the direction of the second end, wherein the plurality of plate elements are essentially flat in form in the first annular region and are arranged perpendicular to the axis of rotation.

6. The plate separator according to claim 5, wherein the substance mixture can be fed to the plurality of plate elements in the region of the first annular region.

7. The plate separator according to claim 5, wherein the plurality of plate elements each have a second annular region, which respectively adjoins the first annular region and extends up to the second end, wherein the plurality of plate elements have essentially the form of a conical section in the second annular region and enclose an angle of less than 90° and greater than 0° with the axis of rotation.

8. The plate separator according to claim 2, wherein the plurality of plate elements are formed in one piece with the rotor.

9. The plate separator according to claim 1, wherein a housing, which is firmly connected to the stator.

* * * * *